US012659541B2

(12) United States Patent
Zhu et al.

(10) Patent No.: US 12,659,541 B2
(45) Date of Patent: Jun. 16, 2026

(54) LIVE STREAM VIDEO PROCESSING METHOD, APPARATUS, ELECTRONIC DEVICE, AND STORAGE MEDIUM

(71) Applicant: Beijing Zitiao Network Technology Co., Ltd., Beijing (CN)

(72) Inventors: Chengcheng Zhu, Beijing (CN); Wen Zhang, Beijing (CN); Fei Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/857,173

(22) PCT Filed: Mar. 31, 2023

(86) PCT No.: PCT/CN2023/085650
§ 371 (c)(1),
(2) Date: Oct. 15, 2024

(87) PCT Pub. No.: WO2023/207516
PCT Pub. Date: Nov. 2, 2023

(65) Prior Publication Data
US 2025/0287064 A1 Sep. 11, 2025

(30) Foreign Application Priority Data
Apr. 27, 2022 (CN) .......................... 202210459338.8

(51) Int. Cl.
*H04N 21/2187* (2011.01)
*H04N 21/431* (2011.01)
*H04N 21/4788* (2011.01)

(52) U.S. Cl.
CPC ..... *H04N 21/4314* (2013.01); *H04N 21/2187* (2013.01); *H04N 21/4788* (2013.01)

(58) Field of Classification Search
CPC .......... H04N 21/4314; H04N 21/2187; H04N 21/4788; H04N 21/431; H04N 21/435; H04N 21/4312
See application file for complete search history.

(56) References Cited

U.S. PATENT DOCUMENTS

2019/0156432 A1     5/2019  Bastide et al.
2022/0078492 A1*    3/2022  Yang ................... H04L 65/1083

FOREIGN PATENT DOCUMENTS

CN          106303731 A      1/2017
CN          109862380 A      6/2019
CN          111107381 A      5/2020
CN          111970532 A      11/2020
CN          112423110 A      2/2021

OTHER PUBLICATIONS

International Patent Application No. PCT/CN2023/085650; Int'l Search Report; dated Jul. 15, 2023; 2 pages.

* cited by examiner

*Primary Examiner* — Alazar Tilahun
(74) *Attorney, Agent, or Firm* — BakerHostetler

(57) ABSTRACT

The present application provides a live stream video processing method, apparatus, electronic device, and storage medium. The method comprises: obtaining video stream data for a live stream; generating target object area data according to the video stream data; and adding the target object area data to the video stream data and sending the video stream data, so that bullet comments can be rendered and displayed outside an area occupied by a target object in a live streaming process.

16 Claims, 5 Drawing Sheets

LIVE STREAM VIDEO PROCESSING METHOD, APPARATUS, ELECTRONIC DEVICE, AND STORAGE MEDIUM

This application is the U.S. National Stage of International Application No. PCT/CN2023/085650, filed on Mar. 31, 2023, which claims priority of Chinese Patent Application No. CN202210459338.8, filed on Apr. 27, 2022, entitled "Live Stream Video Processing Method, Apparatus, Electronic Device, and Storage Medium", which are incorporated herein by reference in their entireties.

FIELD

The present application relates to the field of computer technologies, and in particular, to a live stream video processing method, apparatus, electronic device, and storage medium.

BACKGROUND

With the development of Internet and intelligent terminals, online live stream has become one of scenes for people to leisure and interact in the era of the network. During the live stream, the user may also send a bullet comment while watching the live stream.

SUMMARY

In view of this, the present application aims to propose a live stream video processing method, apparatus, electronic device and storage medium.

Based on the described purpose, the present application provides a live stream video processing method, comprising:

obtaining video stream data for a live stream;

generating target object area data based on the video stream data;

adding the target object area data to the video stream data and sending the video stream data, to render and display a bullet comment outside an area occupied by a target object during the live stream.

In some embodiments, the method further comprises: obtaining bullet comment data for a live stream; and displaying a live stream picture based on the video stream data, rendering and displaying a bullet comment outside an area occupied by a target object in the live stream picture based on the target object area data and the bullet comment data.

In some embodiments, the video stream data comprises a certain number of video frames; and the generating target object area data based on the video stream data comprises: performing a contour recognition on the video frame to obtain a set of coordinate points corresponding to a recognized target object contour, and using the set of coordinate points as the target object area data.

In some embodiments, the step of adding the target object area data to the video stream data and sending the video stream data comprises: adding the target object area data as supplemental enhancement information to the video stream data based on a predetermined video stream encoding rule.

In some embodiments, the method further comprises determining an area occupied by a target object in a live stream picture through: for each coordinate point in the set of coordinate points, mapping the coordinate point to a target coordinate point based on a predetermined mapping relationship; wherein, the mapping relationship is a mapping relationship among a size of an image output by the contour recognition, a size of an image of the video frame and a size of an image of the live stream picture; sequentially connecting the target coordinate points to obtain a closed curve; and determining an area defined by the closed curve as an area occupied by a target object in a live stream picture.

In some embodiments, the mapping the coordinate point to a target coordinate point based on a predetermined mapping relationship comprises: determining a first scaling parameter based on a size of an image output by the contour recognition and a size of an image of the video frame; determining a second scaling parameter based on a size of an image of the video frame and a size of an image of the live stream picture; determining a clipping parameter based on a size of an image output by the contour recognition, a size of an image of the video frame and a size of an image of the live stream picture; and mapping the coordinate point to a target coordinate point based on the first scaling parameter, the second scaling parameter, and the clipping parameter.

In some embodiments, the coordinate point comprises a horizontal coordinate and a vertical coordinate; mapping the coordinate point to a target coordinate point based on a predetermined mapping relationship comprises: determining a movement parameter based on a size of an image of the live stream picture; mapping the horizontal coordinate based on the first scaling parameter, the second scaling parameter, and the clipping parameter; mapping the vertical coordinate based on the first scaling parameter, the second scaling parameter, and the movement parameter; and obtaining the target coordinate point based on the mapped horizontal coordinate and the mapped vertical coordinate.

According to another aspect of the present disclosure, the present disclosure further provides a live stream video processing method, comprising:

receiving video stream data and bullet comment data for a live stream; wherein, the video stream data carry target object area data, the target object area data being used for determining an area occupied by a target object in a live stream picture; and displaying a live stream picture based on the video stream data, and rendering and displaying a bullet comment outside an area occupied by a target object in the live stream picture based on the target object area data and the bullet comment data.

In some embodiments, the method further comprises determining an area occupied by a target object in a live stream picture through: for each coordinate point in the set of coordinate points, mapping the coordinate point to a target coordinate point based on a predetermined mapping relationship; wherein, the mapping relationship is a mapping relationship among a size of an image output by the contour recognition, a size of an image of the video frame and a size of an image of the live stream picture; sequentially connecting the target coordinate points to obtain a closed curve; and determining an area defined by the closed curve as an area occupied by a target object in the live stream picture.

In some embodiments, the mapping the coordinate point to a target coordinate point based on a predetermined mapping relationship comprises: determining a first scaling parameter based on a size of an image output by the contour recognition and a size of an image of the video frame; determining a second scaling parameter based on a size of an image of the video frame and a size of an image of the live stream picture; determining a clipping parameter based on a size of an image output by the contour recognition, a size of an image of the video frame and a size of an image of the live stream picture; and mapping the coordinate point to a target coordinate point based on the first scaling parameter, the second scaling parameter, and the clipping parameter.

In some embodiments, the coordinate point comprises a horizontal coordinate and a vertical coordinate; mapping the coordinate point to a target coordinate point based on a predetermined mapping relationship comprises: determining a movement parameter based on a size of an image of the live stream picture; mapping the horizontal coordinate based on the first scaling parameter, the second scaling parameter, and the clipping parameter; mapping the vertical coordinate based on the first scaling parameter, the second scaling parameter, and the movement parameter; and obtaining the target coordinate point based on the mapped horizontal coordinate and the mapped vertical coordinate.

According to another aspect of the present disclosure, the present application also provides a live video processing apparatus, comprising:

an obtaining module configured to obtain video stream data for a live stream;

a generation module configured to generate target object area data based on the video stream data; and a sending module configured to add the target object area data to the video stream data and send the video stream data, to render and display a bullet comment outside an area occupied by a target object during the live stream.

According to another aspect of the present disclosure, the present application also provides a live stream video processing apparatus, comprising:

a receiving module configured to receive video stream data and bullet comment data for a live stream; wherein, the video stream data carry target object area data, the target object area data being used for determining an area occupied by a target object in a live stream picture;

a display module configured to display a live stream picture based on the video stream data, and render and display a bullet comment outside an area occupied by a target object in the live stream picture based on the target object area data and the bullet comment data.

According to another aspect of the present disclosure, the present disclosure further provides an electronic device, comprising a processor, and a computer program stored in the memory, the computer program being executable by the processor, wherein the processor implements the described method according to any of above aspects when executing the program.

According to another aspect of the present disclosure, the present application further provides a non-transitory computer-readable storage medium, wherein the non-transitory computer-readable storage medium stores a computer instruction, and the computer instruction is used to enable a computer to execute the method according to any one of the above aspects.

BRIEF DESCRIPTION OF THE DRAWINGS

To describe the technical solutions in the present application or the related art more clearly, the following briefly introduces the accompanying drawings required for describing the embodiments or the related art. Apparently, the accompanying drawings in the following description show merely embodiments of the present application, and a person of ordinary skill in the art may still derive other drawings from these accompanying drawings without creative efforts.

DETAILED DESCRIPTION

Figure 1:
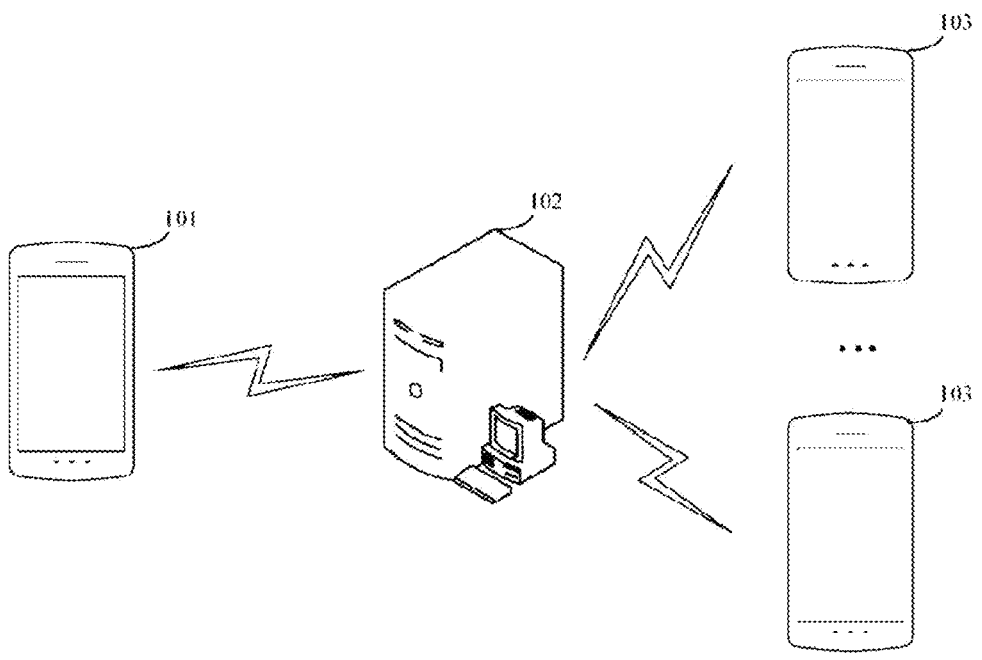
FIG. 1 is a schematic diagram of an application scenario according to an embodiment of the present application.

In order to make objects, technical solutions and advantages of the present application more apparent, the present application will be further described in detail below in conjunction with specific embodiments and with reference to the accompanying drawings.

The principles and spirit of the present application will be described below with reference to exemplary embodiments. It should be understood that these embodiments are given merely to enable those skilled in the art to better understand and further implement the present application, but not to limit the scope of the present application in any way. Rather, these embodiments are provided so that this disclosure will be thorough and complete, and will fully convey the scope of the disclosure to those skilled in the art.

According to embodiments of the present application, a live stream video processing method, apparatus, electronic device, and storage medium are provided.

In this document, it should be understood that any number of elements in the drawings is used as an example and not a limitation, and that any name is only used for distinguishing without any limiting meaning.

The principles and spirit of the present application are explained in detail below with reference to several representative embodiments of the present application.

In the live stream process, a live stream viewer can enable a bullet comment (also referred to as dynamic comment) function, and after the bullet comment function is enabled, a large number of comments in the form of a subtitle (or image) sent by all the live viewers will be displayed in the live stream video, This enables a viewer to not only watch a current live stream video, but also to see bullet comment interactions of other video viewers for the live stream video, This increases the interestingness and interactivity of the live stream process. However, when a large number of bullet comments are simultaneously displayed in a current live stream picture, it is easy to block a target object in the current live stream video; For example, the target object may be a avatar (a virtual anchor), or an information display window with specific information (such as an advertisement) for a viewer to read, so that the viewer cannot clearly and completely watch the target object in a live stream video, which affects a live stream experience. It can be understood that, in a live stream scenario, a target object in a live stream video is exactly the most important video content in the live stream video, and is also the content that a viewer expects to watch clearly. When a large number of bullet comments cover a target object in a live stream video, the live stream experience will be significantly affected. Although some solutions for covering a target object in a live stream video by a bullet comment also emerge at present, an extra configuration needs to be performed on a live stream video watching end, which is not easy to implement and has a high cost.

In the related art, there are some solutions for realizing a bullet comment to avoid a target object in a video. However, the solutions in the related art are directed to a video playing scenario, and a video played in the scenario is off-line, and corresponding processing needs to be performed on an off-line video in advance, so as to realize the effect of a bullet comment avoiding a target object in a video. The solution in the related art cannot be applied to an online live stream scenario.

With regard to the described problem, the present application provides a live stream video processing solution. On the basis of video stream data for live stream, at a anchor end or a server, target object area data for representing an area occupied by a target object in a live stream picture is generated, and the target object area data is added to video stream data of the live stream and then sent to a live stream watching end. On a anchor end and a video stream watching end, based on target object area data carried in video stream data, an area occupied by a target object in a live stream picture can be determined, and a bullet comment is only rendered and displayed in the live steam picture outside the area occupied by the target object, thereby realizing the effect of the bullet comment avoiding the target object during the live stream. The solution of the present application avoids the blocking of a bullet comment on a target object in a live stream video. The processing is only performed at an anchor end or a server to obtain target object area data, and the target object area data is added to video stream data for transmission; therefore, only hardware configurations of the anchor end or the server need to be correspondingly set, and hardware configurations of a video stream watching end do not need to be additionally set, thereby the present solution being strong in compatibility and easy to implement.

Referring to FIG. 1, it is a schematic diagram of an application scenario of a live stream video processing method according to an embodiment of the present application.

The application scenario comprises a client device 101, a client device 103 and a server 102, wherein the client device 101 and the client device 103 may both be connected to the server 102 via a network so as to realize data interaction.

Optionally, the client device 101 and the client device 103 may be an electronic device that has data transmission and multimedia input/output functions and is close to a user side, such as a computer, a tablet computer, a smart phone, a vehicle-mounted computer, and a wearable device.

Optionally, the server 102 may be an independent physical server, may also be a server cluster or a distributed system formed by a plurality of physical servers, and may also be a cloud server.

In an online live stream scenario in the embodiment of the present application, the client device 101 may be a client device used by an anchor, and in order to make a clearer representation, the client device is referred to as an anchor end in the embodiment of the present application. The client device 103 may be a client device used by a live stream viewer, and is referred to as a viewing end in the embodiments of the present application for more clear expression; In general, there may be a plurality of viewing ends.

Specifically, both the anchor end and the viewing end may communicate with the server 102 through the installed live stream client, so as to use the online live stream service provided by the server 102.

The following describes a live stream video processing method according to an exemplary embodiment of the present application with reference to an application scenario in FIG. 1. It should be noted that the foregoing application scenarios are merely shown for facilitating understanding of the spirit and principle of the present application, and the implementation of the present application is not limited in this aspect. Rather, embodiments of the present application may be applied to any scenario where it is applicable.

First of all, the embodiments of the present application provide a live stream video processing method, and the method is applied to an anchor end.

Figure 2:
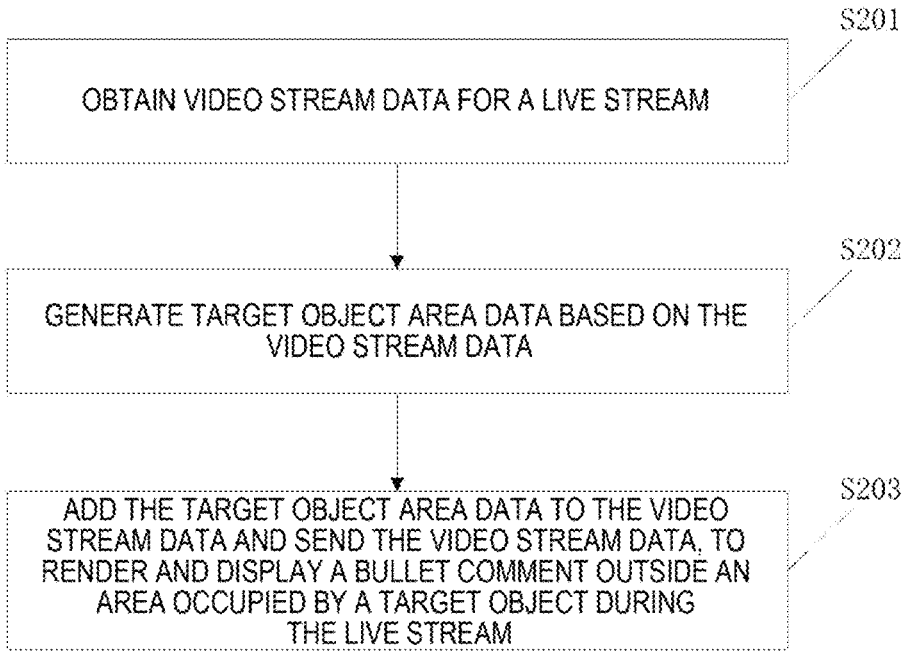
FIG. 2 is a flowchart of a live stream video processing method for an anchor end or a server according to an embodiment of the present application.

Referring to FIG. 2, the live stream video processing method in this embodiment may include the following steps:

Step S201: obtain video stream data for a live stream.

In this embodiment, the video stream data used for live stream refers to video data generated by the anchor end and used for live stream online to each viewing end. Generally, the video stream data is acquired by an image obtaining apparatus (for example, a camera) set by the anchor end or connected externally and is sent to the server after being processed by the streaming media processing software set by the anchor end.

Step S202, generate target object area data based on the video stream data.

In this embodiment, the target object area data refers to data used to represent an area occupied by a target object in a live stream picture. The target object may be an object expected to be displayed to the audience in the live stream picture, such as an avatar (virtual anchor) in the live stream picture, or a part of the avatar, or a commodity displayed in the live stream picture, or a display element in the live stream picture, such as an information display box (commodity lecturing card), and in particular, an object that is not expected to be blocked by a bullet comment and affects the experience of the audience in the live stream picture; correspondingly, the area occupied by the target object may refer to an area defined by the outer contour of the target object in the live stream picture, and the picture content in the area is generally the live stream content which is not desired to be blocked by the bullet comment in the solution of the present application.

In this embodiment, the video stream data includes a certain number of video frames arranged in sequence according to the live stream playing time sequence, and each video frame is a frame of image of the live stream video. In this step, when generating the target object area data according to the video stream data, the target object area data may be generated for each video frame correspondingly.

As an optional implementation, the target object area data may be obtained by identifying coordinate points corresponding to the contour. Specifically, the method for generating target object area data according to video stream data may comprise: performing contour recognition on a video frame to obtain a set of coordinate points corresponding to a contour of a recognized target object, and using the set of coordinate points as target object area data.

The contour recognition of the video frame and the generation of the coordinate points of the contour of the target object may be implemented by using a Matting algorithm and a FindContour algorithm. The Matting algorithm may perform contour recognition on the video frame to recognize contours of target objects included in the video frame. Based on the contour of the target object, all coordinate points corresponding to the contour of the target object are output by using a FindContour algorithm, and these coordinate points form a set of coordinate points corresponding to the contour of the target object in the video frame. The set of coordinate points can be taken as target object area data, wherein the Matting algorithm and the FindContour algorithm can be pre-deployed locally on the anchor end, and are locally called when being used; in addition, the described algorithm can also be deployed in a storage location of the network side, for example, an algorithm platform providing open interface access, and when the described algorithm is used, the anchor end accesses algorithm platform correspondingly for invoking, and receives a calculation result.

It should be understood that, during specific implementation, in addition to the foregoing Matting algorithm and FindContour algorithm, other feasible relevant solutions may also be used to perform contour recognition on a video frame and generate a coordinate point corresponding to a contour of a target object, which is not limited in the embodiment of the present application.

In addition, it should be noted that, for a video frame, there may be more than one target object included therein, and correspondingly generated target object area data should correspond to the number of target objects included in the video frame. Furthermore, with regard to a target object in each video frame, target object area data corresponding thereto is respectively generated and stored. For example, in the foregoing manner of obtaining a coordinate point set by using a FindContour algorithm, when a video frame includes a plurality of target objects, a set of corresponding coordinate points is generated for each target object separately.

Step S203: add the target object area data to the video stream data and send the video stream data, to render and display a bullet comment outside an area occupied by a target object during the live stream.

In this embodiment, with regard to the target object area data generated in the described steps, the target object area data is added to video stream data, so that the video stream data carry the target object area data and is pushed to the live stream server; subsequently, when the viewing end pulls the video stream data from the live stream server, the pulled video stream data is the described video stream data carrying the target object area data.

As an alternative embodiment, the target object area data may be added to the video stream data as supplemental enhancement information (SEI). Specifically, adding target object area data to video stream data and sending the video stream data may comprise: adding the target object area data to the video stream data as supplemental enhancement information according to a predetermined video stream encoding rule.

The SEI is one of characteristics of a video stream encoding compression standard H.264/H.265. The SEI may be added in a process of generating and transmitting video stream data, and data carried in the SEI is transmitted to a playing end of the video stream data together with the video stream data. In the related art, common contents of the SEI may be a compression encoding parameter, a camera parameter, etc. In the embodiments of the present application, based on the described features of the SEI, the data for generating the target object area is added to the video stream data by means of the SEI. By adding target object area data to video stream data by means of SEI, the features of SEI can be utilized and the target object area data can be fully utilized, and at the same time, the structure and transmission mode of existing video stream data do not change, and the compatibility is excellent.

In addition, during specific implementation, in addition to the foregoing manner of using the SEI to add the target object area data, any other feasible relevant solution may also be used to add the target object area data to the video stream data, which is not limited in the embodiment of the present application.

In this embodiment, the video stream data carrying the area data of the target object is pushed to the live stream server When the video stream data is pulled by the viewing end for live stream, the viewing end may determine an area occupied by a target object in a live stream picture according to the target object area data carried by the video stream data, and when a bullet comment effect is enabled, based on the determined area occupied by the target object in the live stream picture, the bullet comment is only rendered and displayed outside this area. Wherein, a specific manner of determining, according to the target object area data, the area occupied by the target object in the live stream picture is described in detail in the following embodiments.

It can be seen that in the method of the embodiments of the present application, target object area data for representing an area occupied by a target object in a live stream picture is generated at an anchor end, the target object area data is added to video stream data and then sent, and after the video stream data is subsequently pulled by the viewing end, the target object area data can be directly obtained and the effect of a bullet comment avoiding the target object is correspondingly achieved. The processing of target object area data is only performed at an anchor end, and neither the live stream server nor the viewing end needs to perform too many additional configurations, so that while the effect of a bullet comment avoiding a target object is achieved, the solution is easy to implement and has higher compatibility.

In some optional embodiments, in addition to sending the video stream data carrying the area data of the target object, the anchor end also needs to display a live stream picture locally correspondingly, and in the live stream picture displayed by the anchor end, the effect of a bullet comment avoiding the target object also needs to be achieved. Therefore, the live stream video processing method applied to an anchor end may further comprise: obtaining bullet comment data for a live stream; displaying a live stream picture based on the video stream data, rendering and displaying a bullet comment outside an area occupied by a target object in the live stream picture based on the target object area data and the bullet comment data.

Wherein the bullet comment data is obtained by the anchor end from the live stream server, wherein the bullet comment data comprises bullet comments sent by various viewing ends in the current live stream. Based on the obtained bullet comment data, when the bullet comment function of the current live stream is enabled, the bullet comment can be displayed in the live stream picture according to the bullet comment data. For example, the processing of video stream data and bullet comment data may be implemented by means of an EffectSDK; and the EffectSDK provides a cross-platform audio/video special effect library, and may realize abundant audio/video special effects, graphic and text editing and rendering, interactive functions, etc.

In this embodiment, generating and displaying a bullet comment may be implemented by any feasible related technologies, for example, the bullet comment may be generated and displayed in a live stream picture in a manner of mask layer; The mask layer, also referred to as a cover layer or a masking layer, can be intuitively understood as an image layer displayed on a live stream picture, and by setting the transparency, the mask layer can mask a part of the image layer covered thereby; when a bullet comment is generated and displayed by means of the mask layer rendering, the bullet comment is generated in the form of a text or a picture, etc. and is displayed in a live stream picture, so as to achieve a bullet comment effect in the live stream picture.

Figure 3:
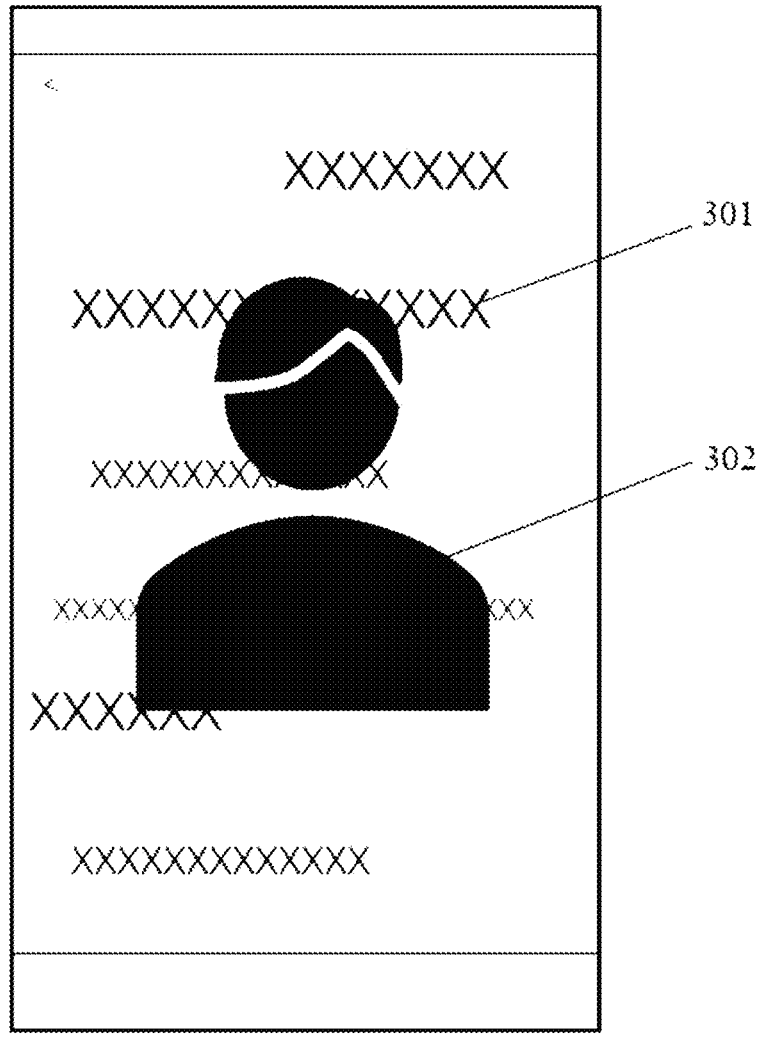
FIG. 3 is a schematic diagram of a live stream picture of a bullet comment avoiding a target object according to an embodiment of the present application.

In this embodiment, based on the target object area data carried in the video stream data, the area occupied by the target object in the live stream picture may be determined according to the target object area data. When the bullet comment is displayed, the bullet comment may be rendered and displayed only outside the area occupied by the target object. Taking the implementation of the bullet comment by a mask layer as an example, based on the determined area occupied by the target object in the live stream picture, by means of setting a mask layer, controlling not to render and generate any bullet comment in the area occupied by the target object in the live stream picture. In this way, the target object in the original live stream picture may be clearly and completely seen in the area occupied by the target object. Thus, the effect of the target bullet comment avoiding the target object is achieved. The effect of a bullet comment avoiding the target object finally formed is shown in FIG. 3. In FIG. 3, the whole picture is a live stream picture, and the bullet comment 301 achieves the effect of avoiding the target object 302 in live stream.

In addition, based on the area occupied by the target object in the live stream picture determined according to the target object area data in the embodiment of the present application, the effect of not rendering and displaying the bullet comment in the area occupied by the target object in the live stream picture and rendering and displaying the bullet comment only outside the area may also be controlled by means of any other feasible related techniques.

As an optional implementation, when the target object area data is a set of coordinate points, the area occupied by the target object in the live stream picture may also be determined by using the following method: for each coordinate point in the set of coordinate points, mapping the coordinate point to a target coordinate point based on a predetermined mapping relationship; sequentially connecting the target coordinate points to obtain a closed curve; and determining an area defined by the closed curve as an area occupied by a target object in a live stream picture.

During specific implementation, considering that, when the target object area data is obtained based on the video stream data, an image size based on which a specific algorithm is specifically used is different from an image size used when a video frame of the video stream data is formed subsequently, and the image size of the video frame is also different from an image size of a live stream picture during playing (an anchor end or a viewing end). Due to the differences in the sizes of the images in the above respective stages, the respective coordinate points in the set of coordinate points should be mapped first. Specifically, a mapping relationship may be preset, where the mapping relationship is a mapping relationship among a size of an image output by contour recognition, a size of an image of a video frame, and a size of an image of a live stream picture. According to the mapping relationship, each coordinate point in the set of coordinate points is first mapped to a representation based on the image size of the video frame, and is mapped to a representation based on the image size of the live stream picture, and the finally obtained coordinate point representation is referred to as a target coordinate point in this embodiment.

During specific implementation, with regard to the target coordinate points obtained through the mapping processing, the target coordinate points are sequentially connected so as to obtain a closed curve. For any two adjacent target coordinate points, a Bezier curve may be connected therebetween, so that all the target coordinate points are sequentially connected to form a closed curve. The area defined by the closed curve may be determined as the area occupied by the target object in the live stream picture. The drawn closed curve may apply any relevant technology, for example, the above closed curve may be formed by using a graphic Api: Path.quadTo in an Android system; Subsequently, a canvas tool CanvasApi in an Android system may be used to draw the closed curve, and a configuration of the mask layer may be combined to control that the bullet comment is not rendered and displayed in an area within the drawn closed curve, thereby clearly and completely displaying a target object in a live stream picture, and realizing the avoidance of the bullet comment.

As an optional implementation, when a coordinate point is obtained by using a FindContour algorithm, mapping the coordinate point to a target coordinate point according to a predetermined mapping relationship may include: determining a first scaling parameter according to a size of an image output by the contour recognition and a size of an image of the video frame; determining a second scaling parameter according to the size of an image of the video frame and the size of an image of the live stream picture; determining a clipping parameter according to a size of an image output by the contour recognition, a size of an image of the video frame and a size of an image of the live stream picture; mapping the coordinate point to a target coordinate point according to the first scaling parameter, the second scaling parameter, and the clipping parameter.

Figure 4:
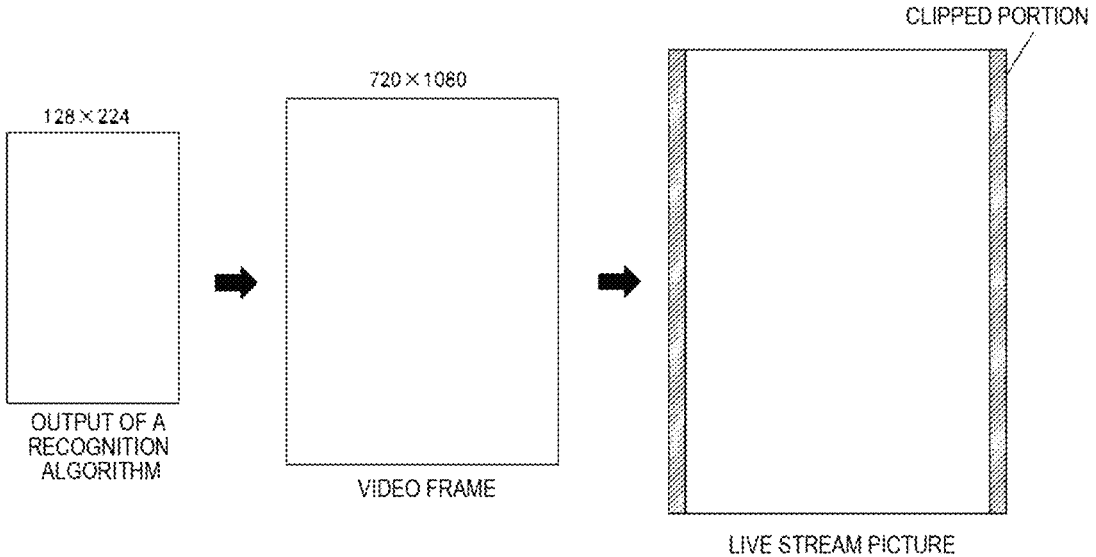
FIG. 4 is a schematic diagram of a mapping relationship according to an embodiment of the present application.

In this embodiment, the output of the FindContour algorithm takes an image (128×224) of a fixed size as a reference system, while the size of the image used for transmission of the video frame is generally (720×1080), and the size of the live stream picture depends on the software and hardware settings of the anchor end or the viewing end. FIG. 4 shows a mapping relationship between the sizes of the foregoing images. According to software and hardware settings of the anchor end or the viewing end, the live stream picture generally clips the picture in a horizontal direction.

Wherein the first scaling parameter is used for realizing mapping of a coordinate point from a size of an image output by a contour recognition to a size of an image of a video frame; a second scaling parameter is used for realizing mapping of a coordinate point from a size of an image of a video frame to a size of an image of a live stream picture; The clipping parameter is used for implementing the horizontal clipping of the live stream picture, which is obtained based on the above mapping relationship.

In specific implementation, the mapping process from the coordinate point to the target coordinate point may be represented by the following formula:

$$x = originX * \left( \frac{STREAM\_WIDTH}{EFFECT\_OUTPUT\_WIDTH} \right) * \left( \frac{PLAYER\_VIEW\_HEIGHT}{STREAM\_HEIGHT} \right) - C;$$

11

-continued $$C = \left(\text{STREAM\_WIDTH} * \frac{\text{PLAYER\_VIEW\_HEIGHT}}{\text{STREAM\_HEIGHT}} - \right.$$
$$\left. \text{PLAYER\_VIEW\_HEIGHT}\right) * 0.5;$$

$$y = origin Y * \left(\frac{\text{STREAM\_HEIGHT}}{\text{EFFECT\_OUTPUT\_HEIGHT}}\right) *$$
$$\left(\frac{\text{PLAYER\_VIEW\_HEIGHT}}{\text{STREAM\_HEIGHT}}\right).$$

In the above formula, x is a horizontal coordinate of the target coordinate point, y is a vertical coordinate of the target coordinate point, and originX is a horizontal coordinate of the coordinate point, originY is a vertical coordinate of a coordinate point, EFFECT_OUTPUT_WIDTH is the width of an image output by a recognition algorithm, and EFFECT_OUTPUT_HEIGHT is the height of an image output by the recognition algorithm, STREAM_WIDTH is an image width of a video frame, STREAM_HEIGHT is a height of an image of the video frame, and PLAYER_VIEW_WIDTH is a width of an image of a live stream picture, PLAYER_VIEW_HIGH is the height of the live stream picture, C is the clipping parameter; In the foregoing parameters, the width refers to a scale of an image in a horizontal direction, and the height refers to a scale of an image in a vertical direction.

In the above calculation formula, the two terms $$\frac{\text{STREAM\_WIDTH}}{\text{EFFECT\_OUTPUT\_WIDTH}}$$

and $$\frac{\text{STREAM\_HIGHT}}{\text{EFFECT\_OUTPUT\_HIGHT}}$$

are the first scaling parameter and the term $$\frac{\text{PLAYER\_VIEW\_HIGHT}}{\text{STREAM\_HIGHT}}$$

is the second scaling parameter.

In some embodiments, in the live stream pictures, not all areas of the live stream pictures are used to display the bullet comment. For example, for a general live stream picture, the upper part of the picture is usually used for displaying some related information related to live stream, such as a live stream room name and a live stream name, and the area displaying the related information is not used for displaying a bullet comment. In consideration of the specific setting stored by the described live stream picture, in this embodiment, in order to realize correspondence between the area occupied by the target object in the finally determined live stream picture and the area actually used for displaying the bullet comments, the coordinate values are further adjusted in the mapping process from the coordinate point to the target coordinate point.

Specifically, in this embodiment, a movement parameter is determined according to the size of the image of the live stream picture and the setting of the area for displaying the bullet comment, and the movement parameter represents the distance from the area for displaying the bullet comment to the upper edge of the live stream picture.

In a specific implementation, mapping processing is performed on a horizontal coordinate of a coordinate point according to a first scaling parameter, a second scaling parameter, and a clipping parameter. For a specific calculation process, reference may be made to the foregoing calculation formula regarding x.

During specific implementation, mapping processing is performed on the vertical coordinate of the coordinate point according to the first scaling parameter, the second scaling parameter, and the movement parameter. The mapping process may be represented by the following formula:

$$y = origin Y * \left(\frac{\text{STREAM\_HIGHT}}{\text{EFFECT\_OUTPUT\_HIGHT}}\right) *$$
$$\left(\frac{\text{PLAYER\_VIEW\_HIGHT}}{\text{STREAM\_HIGHT}}\right) - \text{TOP\_MARGIN};$$

In the above equation, TOP_MARGIN is a movement parameter.

By means of the described mapping processing, the area occupied by the target object in the live stream picture determined based on the obtained target coordinate point can be adapted to the picture output settings of the anchor end and the viewing end, and may correspond to the area actually used for displaying the bullet comment in the live stream picture.

As an optional implementation, the live stream video processing method according to the embodiment of the present application may also be applied to a server. The server refers to a live stream server that is based on the stream media transmission technology and is used to implement an online live stream of the video.

For the steps included in the live stream video processing method applied to the server in the embodiment of the present invention, reference may be made to FIG. 2.

With regard to step S201, a server obtains video stream data uploaded by a viewing end and used for a live stream. In addition, an execution body of steps, such as generation of video stream data and transmission of video stream data, is a server. For a specific implementation of the described steps, reference may be made to the foregoing method embodiments applied to an anchor end, and details are not repeatedly described in this embodiment.

With regard to step 202 and step 203, the execution body of the steps of generating target object area data, adding the target object area data to video stream data, and sending the video stream data, etc. is a server. For the specific implementation of the described steps, reference can be made to the foregoing method embodiments applied to an anchor end, and the details will not be described again in this embodiment.

In addition, the sending-related step in step 203 refers to that the server sends the video stream data to the viewing end after adding the target object area data.

According to the live stream video processing method in this embodiment, after the server receives the video stream data uploaded by the anchor end, based on video stream data for live stream, target object area data representing an area occupied by a target object in a live stream picture is generated. Adding the target object area data to video stream data for live stream and then sending the video stream data to a viewing end, and subsequently, after the viewing end pulls the video stream data, the target object area data can be directly obtained, and the effect of a bullet comment avoiding a target object is correspondingly achieved. The processing of target object area data is only performed by a server, and neither an anchor end nor a viewing end needs to perform too many additional settings, so that the solution is easy to implement while achieving the effect of a bullet comment avoiding a target object, and has a higher compatibility.

Based on the same technical concept, an embodiment of the present application further provides a live stream video processing method, and the method is applied to a viewing end.

Figure 5:
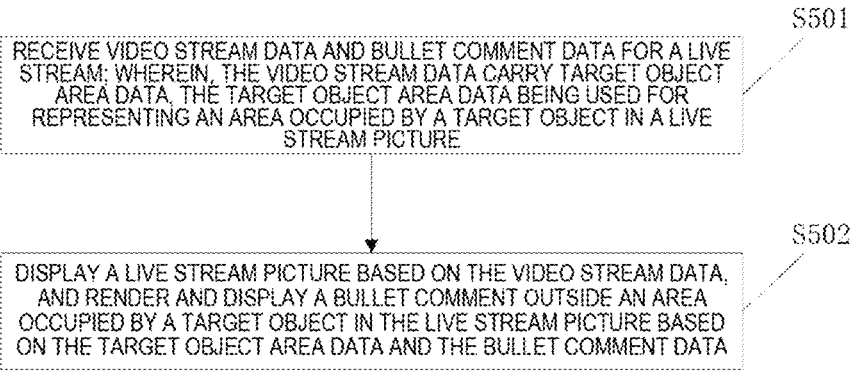
FIG. 5 is a schematic flowchart of a live stream video processing method for a live stream watching end according to an embodiment of the present application.

Referring to FIG. 5, the live stream video processing method in this embodiment may include the following steps:

step S501, receive video stream data and bullet comment data for a live stream; wherein, the video stream data carry target object area data, the target object area data being used for determining an area occupied by a target object in a live stream picture;

step S502, display a live stream picture based on the video stream data, and render and display a bullet comment outside an area occupied by a target object in the live stream picture based on the target object area data and the bullet comment data.

In this embodiment, the video stream data and bullet comment data for live stream are pulled by the viewing end from the live stream server, so as to display the live stream picture and the bullet comment in the live stream picture. Because the video stream data carry target object area data, the viewing end may determine an area occupied by a target object in a live stream picture according to the target object area data, and controlling to display of a bullet comment only in an area outside the area occupied by the target object in the live stream picture. A bullet comment is not rendered in an area within an area occupied by a target object in a live stream picture, and the target object in the live stream picture is clearly and completely displayed. Thus, the effect of a bullet comment avoiding the target object is achieved.

This embodiment relates to specific implementations and corresponding beneficial effects, such as displaying a live stream picture, rendering and displaying bullet comment, determining an area occupied by a target object in the live stream picture, and mapping a coordinate point to a target coordinate point according to a predetermined mapping relationship. The foregoing method embodiments applied to the anchor end have been described in detail, and for their specific implementations, reference may be made to any foregoing method embodiments applied to the anchor end. This embodiment does not repeat those details herein.

It should be noted that the method according to the embodiment of the present application may be executed by a single device, such as a computer or a server. The method in this embodiment may also be applied to a distributed scenario, and multiple devices cooperate with each other to complete the method. In a distributed scenario, one of the multiple devices may execute only one or more steps in the method according to the embodiment of the present application, and the multiple devices may interact with each other to implement the method.

It should be noted that, some embodiments of the present application are described above, and other embodiments are within the scope of the appended claims. In some cases, the actions or steps recited in the claims may be performed in a different order than in the embodiments described above and still achieve desirable results. In addition, the processes depicted in the figures do not necessarily require the particular order shown, or sequential order, to achieve desirable results. In certain embodiments, multitasking and parallel processing may also or may be advantageous.

Figure 6:
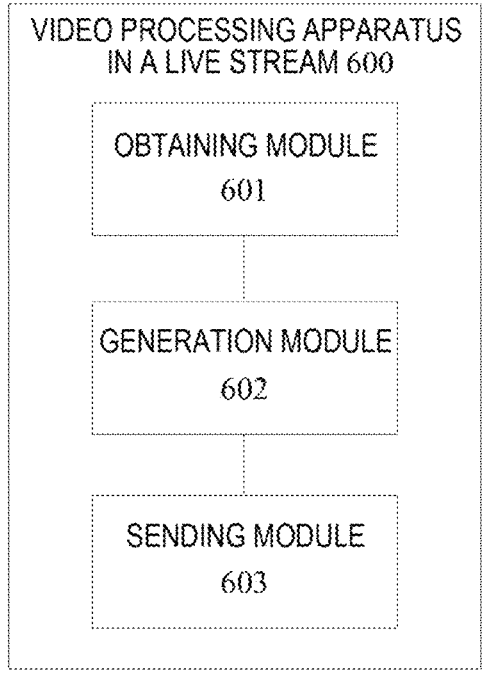
FIG. 6 is a schematic diagram of the structure of a apparatus for processing live stream video of an anchor end or a server according to an embodiment of the present application.

Based on the same technical concept, an embodiment of the present application further provides a live stream video processing apparatus. Referring to FIG. 6, the live stream video processing apparatus 600 includes:

an obtaining module 601 configured to obtain video stream data for a live stream;

a generation module 602 configured to generate target object area data based on the video stream data; and a sending module 603 configured to add the target object area data to the video stream data and send the video stream data, to render and display a bullet comment outside an area occupied by a target object during the live stream.

In some optional embodiments, the device further comprises: a display module configured to obtain bullet comment data for a live stream; display a live stream picture based on the video stream data, rendering and displaying a bullet comment outside an area occupied by a target object in the live stream picture based on the target object area data and the bullet comment data.

In some optional embodiments, the video stream data comprises a certain number of video frames; and the generation module 602 is specifically configured to perform a contour recognition on the video frame to obtain a set of coordinate points corresponding to a recognized target object contour, and use the set of coordinate points as the target object area data.

In some optional embodiments, the sending module 603 is specifically configured to add the target object area data as supplemental enhancement information to the video stream data based on a predetermined video stream encoding rule.

In some optional embodiments, the display module is specifically configured to, for each coordinate point in the set of coordinate points, map the coordinate point to a target coordinate point based on a predetermined mapping relationship; wherein, the mapping relationship is a mapping relationship among a size of an image output by the contour recognition, a size of an image of the video frame and a size of an image of the live stream picture; sequentially connect the target coordinate points to obtain a closed curve; and determine an area defined by the closed curve as an area occupied by a target object in a live stream picture.

In some optional embodiments, the display module is specifically configured to determine a first scaling parameter based on a size of an image output by the contour recognition and a size of an image of the video frame; determine a second scaling parameter based on a size of an image of the video frame and a size of an image of the live stream picture; determine a clipping parameter based on a size of an image output by the contour recognition, a size of an image of the video frame and a size of an image of the live stream picture; and map the coordinate point to a target coordinate point based on the first scaling parameter, the second scaling parameter, and the clipping parameter.

In some optional embodiments, the coordinate point comprises a horizontal coordinate and a vertical coordinate; a display module, specifically configured to determine a movement parameter based on a size of an image of the live stream picture; map the horizontal coordinate based on the first scaling parameter, the second scaling parameter, and the clipping parameter; map the vertical coordinate based on the first scaling parameter, the second scaling parameter, and the movement parameter; and obtain the target coordinate point based on the mapped horizontal coordinate and the mapped vertical coordinate.

For ease of description, the foregoing apparatus is described by dividing functions into various modules for separate description. Definitely, when the present application is implemented, functions of each module may be implemented in one or more pieces of software and/or hardware.

The apparatus in the above embodiment is used for implementing the corresponding live stream video processing method in any one of the above embodiments applied to an anchor end or a server, and has the beneficial effect of the corresponding method embodiment, which will not be described herein again.

Figure 7:
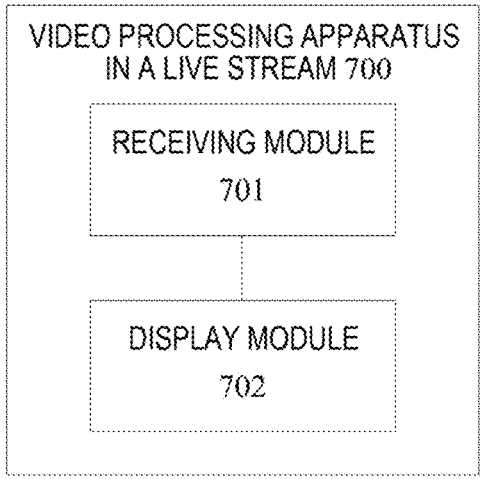
FIG. 7 is a schematic structural diagram of an apparatus for live stream video processing of a live stream watching end according to an embodiment of the present application.

Based on the same technical concept, an embodiment of the present application further provides a live stream video processing apparatus. Referring to FIG. 7, the live stream video processing apparatus 700 includes:

a receiving module 701 configured to receive video stream data and bullet comment data for a live stream; wherein, the video stream data carry target object area data, the target object area data being used for determining an area occupied by a target object in a live stream picture;

a display module 702 configured to display a live stream picture based on the video stream data, and render and display a bullet comment outside an area occupied by a target object in the live stream picture based on the target object area data and the bullet comment data.

In some optional embodiments, the display module 702 is specifically configured to, for each coordinate point in the set of coordinate points, map the coordinate point to a target coordinate point based on a predetermined mapping relationship; wherein, the mapping relationship is a mapping relationship among a size of an image output by the contour recognition, a size of an image of the video frame and a size of an image of the live stream picture; sequentially connect the target coordinate points to obtain a closed curve; and determine an area defined by the closed curve as an area occupied by a target object in the live stream picture.

In some optional embodiments, the display module 702 is specifically configured to determining a first scaling parameter based on a size of an image output by the contour recognition and a size of an image of the video frame; determine a second scaling parameter based on a size of an image of the video frame and a size of an image of the live stream picture; determine a clipping parameter based on a size of an image output by the contour recognition, a size of an image of the video frame and a size of an image of the live stream picture; map the coordinate point to a target coordinate point based on the first scaling parameter, the second scaling parameter, and the clipping parameter.

In some optional embodiments, the coordinate point comprises a horizontal coordinate and a vertical coordinate; the display module 702 is specifically configured to determine a movement parameter based on a size of an image of the live stream picture; map the horizontal coordinate based on the first scaling parameter, the second scaling parameter, and the clipping parameter; map the vertical coordinate based on the first scaling parameter, the second scaling parameter, and the movement parameter; and obtain the target coordinate point based on the mapped horizontal coordinate and the mapped vertical coordinate.

For ease of description, the foregoing apparatus is described by dividing functions into various modules for separate description. Definitely, when the present application is implemented, functions of each module may be implemented in one or more pieces of software and/or hardware.

The apparatus in the foregoing embodiments is configured to implement any corresponding live stream video processing method in the foregoing embodiments applied to a viewing end, and has beneficial effects of the corresponding method embodiments, which are not described herein again.

Based on the same technical concept, the embodiments of the present application further provide an electronic device, comprising a memory, a processor and a computer program stored in the memory and operable on the processor. When executing the program, the processor implements the live stream video processing method as described in any of the above embodiments.

Figure 8:
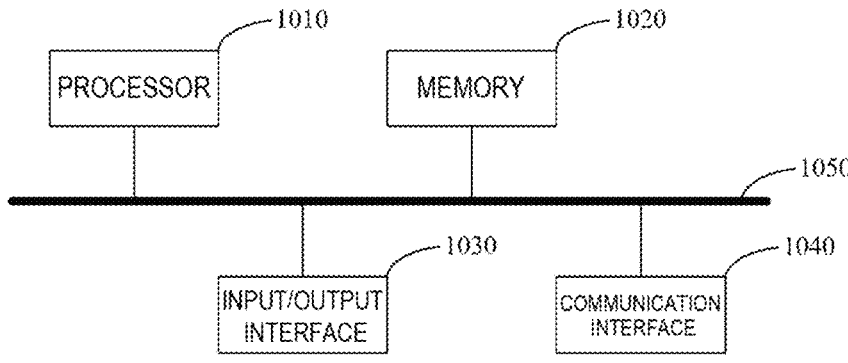
FIG. 8 is a schematic structural diagram of an electronic device according to an embodiment of the present application.

FIG. 8 is a schematic structural diagram of hardware of a more specific electronic device according to this embodiment. The device may include: a processor 1010, a memory 1020, an input/output interface 1030, a communications interface 1040, and a bus 1050. The processor 1010, the memory 1020, the input/output interface 1030, and the communications interface 1040 are connected to each other inside the device through the bus 1050.

The processor 1010 may be implemented by using a universal CPU (Central Processing Unit), a microprocessor, an application specific integrated circuit (ASIC), or one or more integrated circuits, and is configured to execute a relevant program, so as to implement the technical solutions provided in the embodiments of the specification.

The memory 1020 may be implemented in the form of a ROM (Read Only Memory), a RAM (Random Access Memory), a static storage device, and a dynamic storage device. The memory 1020 may store an operating system and other application programs. When the technical solutions provided in the embodiments of the present invention are implemented by software or firmware, related program codes are stored in the memory 1020 and invoked and executed by the processor 1010.

The input/output interface 1030 is configured to connect to an input/output module to input and output information. The input/output module may be configured in a device (not shown in the figure) as a component, and may also be externally connected to the device to provide corresponding functions. The input device may include a keyboard, a mouse, a touch screen, a microphone, various sensors, and the like, and the output device may include a display, a speaker, a vibrator, an indicator lamp, and the like.

The communications interface 1040 is configured to connect to a communications module (not shown in the figure), so as to implement communication and interaction between this device and another device. The communication module may implement communication in a wired manner (such as a USB and a network cable), and may also implement communication in a wireless manner (such as a mobile network, WIFI, and Bluetooth).

The bus 1050 may comprise a pathway that may enable communication of information between various components of the device, for example, the processor 1010, the memory 1020, the input/output interface 1030, and the communication interface 1040.

It should be noted that, although the foregoing device only shows the processor 1010, the memory 1020, the input/output interface 1030, the communications interface 1040, and the bus 1050, in a specific implementation process, the device can further include other components necessary for implementing normal running. In addition, a person skilled in the art may understand that the foregoing device may also only include components necessary for implementing solutions of embodiments of the present specification, and does not necessarily include all components shown in the figure.

The electronic device in the foregoing embodiment is configured to implement the corresponding live stream video processing method in any one of the foregoing embodiments, and has beneficial effects of the corresponding method embodiment, which are not described herein again.

Based on the same technical concept, the embodiments of the present application further provide a non-transitory computer-readable storage medium. The non-transitory computer-readable storage medium stores a computer instruction. The computer instruction is used for enabling the computer to execute the live stream video processing method according to any one of the above embodiments.

The computer readable media of this embodiment, including both persistent and non-persistent, removable and non-removable media, may apply any method or technology for storage of information. The information may be computer readable instructions, data structures, modules of a program, or other data. Examples of computer storage media include, but not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only compact disc read-only memory (CD-ROM), digital versatile discs (DVD) or other optical storage, magnetic cassettes, Magnetic tape magnetic disk storage or other magnetic storage devices, or any other non-transmission medium, may be used to store information that may be accessed by a computing device.

The computer instruction stored in the storage medium in the foregoing embodiment is used to enable the computer to execute the live stream video processing method in any one of the foregoing embodiments, and has beneficial effects of the corresponding method embodiments, which are not described herein again.

It should be noted that, unless otherwise defined, technical terms or scientific terms used in the embodiments of the present application should have a common meaning understood by those skilled in the art. The terms "first", "second", and the like used in the embodiments of the present application do not indicate any order, quantity, or importance, but are only used to distinguish different components. Words of "including" or "include" and the like mean that the element or item before the word appears to encompass the element or item listed after the word and equivalents thereof, without excluding other elements or items. Words such as "connected" or "connection" are not limited to physical or mechanical connections, but may include electrical connections, whether direct or indirect. The articles 'a' or 'an' preceding an element do not exclude the presence of a plurality of such elements.

It should be understood by one of ordinary skill in the art that the discussion of any embodiment above is merely exemplary and is not intended to imply that the scope of the present application, including the claims, nor is limited to these examples; In the idea of the present application, technical features in the foregoing embodiments or in different embodiments may also be combined, and steps may be implemented in any order, and there are many other variations in different aspects of the embodiments of the present application as described above, which are not provided in detail for simplicity.

It is intended that the present application cover all such alternatives, modifications and variations as belong to the broad scope of the appended claims. Therefore, any omissions, modifications, equivalents and improvements made without departing from the spirit and principle of the embodiments of the present application shall belong to the scope of protection of the present application.

What is claimed is:

1. A live stream video processing method, wherein the method comprises:

obtaining video stream data for a live stream;

generating object area data based on the video stream data, wherein the video stream data comprises at least one video frame, and wherein the generating object area data based on the video stream data comprises:

performing a contour recognition on the at least one video frame to obtain a set of coordinate points corresponding to a recognized object contour, and generating the object area data using the set of coordinate points; and adding the object area data to the video stream data and sending the video stream data, for displaying a dynamic comment outside an area occupied by an object in an interface of the live stream.

2. The method of claim 1, wherein the method further comprises:

obtaining dynamic comment data for a live stream; and displaying a live stream picture based on the video stream data, rendering and displaying a dynamic comment outside an area occupied by the object in the live stream picture based on the object area data and the dynamic comment data.

3. The method of claim 1, wherein the adding the object area data to the video stream data and sending the video stream data comprises:

adding the object area data as supplemental enhancement information to the video stream data based on a predetermined video stream encoding rule.

4. The method of claim 1, wherein the method further comprises determining the area occupied by the object in a live stream picture through:

for each coordinate point in the set of coordinate points, mapping the coordinate point to a target coordinate point based on a predetermined mapping relationship, wherein the mapping relationship is a mapping relationship among a size of an image output by the contour recognition, a size of an image of the video frame and a size of an image of the live stream picture;

sequentially connecting the target coordinate points to obtain a closed curve; and determining an area defined by the closed curve as the area occupied by the object in the live stream picture.

5. The method of claim 4, wherein the mapping the coordinate point to the target coordinate point based on the predetermined mapping relationship comprises:

determining a first scaling parameter based on the size of the image output by the contour recognition and the size of the image of the video frame;

determining a second scaling parameter based on the size of the image of the video frame and the size of the image of the live stream picture;

determining a clipping parameter based on the size of the image output by the contour recognition, the size of the image of the video frame and the size of the image of the live stream picture; and mapping the coordinate point to the target coordinate point based on the first scaling parameter, the second scaling parameter, and the clipping parameter.

6. The method of claim 5, wherein the coordinate point comprises a horizontal coordinate and a vertical coordinate;

mapping the coordinate point to the target coordinate point based on the predetermined mapping relationship comprises:

determining a movement parameter based on the size of the image of the live stream picture;

mapping the horizontal coordinate based on the first scaling parameter, the second scaling parameter, and the clipping parameter;

mapping the vertical coordinate based on the first scaling parameter, the second scaling parameter, and the movement parameter; and obtaining the target coordinate point based on the mapped horizontal coordinate and the mapped vertical coordinate.

7. A live stream video processing method, wherein the method comprises:

receiving video stream data and dynamic comment data for a live stream; wherein the video stream data carry object area data, the object area data being used for determining an area occupied by an object in a live stream picture;

displaying the live stream picture based on the video stream data, and displaying a dynamic comment outside the area occupied by the object in the live stream picture based on the object area data and the dynamic comment data; and wherein the method further comprises determining the area occupied by the object in the live stream picture, and the determining the area occupied by the object in the live stream picture comprises:

mapping each coordinate point in a set of coordinate points to a target coordinate point based on a predetermined mapping relationship, wherein the predetermined mapping relationship is a mapping relationship among a size of an image output by contour recognition, a size of an image of a video frame, and a size of an image of the live stream picture, sequentially connecting the target coordinate points to obtain a closed curve, and determining an area defined by the closed curve as the area occupied by the object in the live stream picture.

8. The method of claim 7, wherein the mapping each coordinate point to the target coordinate point based on the predetermined mapping relationship comprises:

determining a first scaling parameter based on the size of the image output by the contour recognition and the size of the image of the video frame;

determining a second scaling parameter based on the size of the image of the video frame and the size of the image of the live stream picture;

determining a clipping parameter based on the size of an image output by the contour recognition, the size of the image of the video frame and the size of the image of the live stream picture; and mapping each coordinate point to the target coordinate point based on the first scaling parameter, the second scaling parameter, and the clipping parameter.

9. The method of claim 8, wherein each coordinate point comprises a horizontal coordinate and a vertical coordinate;

mapping each coordinate point to the target coordinate point based on the predetermined mapping relationship comprises:

determining a movement parameter based on the size of the image of the live stream picture;

mapping the horizontal coordinate based on the first scaling parameter, the second scaling parameter, and the clipping parameter;

mapping the vertical coordinate based on the first scaling parameter, the second scaling parameter, and the movement parameter; and obtaining the target coordinate point based on the mapped horizontal coordinate and the mapped vertical coordinate.

10. An electronic device, comprising a memory, a processor, and a computer program stored in the memory, the computer program being executable by the processor, wherein the computer program, when being executed by the processor, causes the processor to implement operations comprising:

obtaining video stream data for a live stream;

generating object area data based on the video stream data, wherein the video stream data comprises at least one video frame, and wherein the generating object area data based on the video stream data comprises:

performing a contour recognition on the at least one video frame to obtain a set of coordinate points corresponding to a recognized object contour, and generating the object area data using the set of coordinate points; and adding the object area data to the video stream data and sending the video stream data, for displaying a dynamic comment outside an area occupied by an object in an interface of the live stream; or the computer program upon execution by the processor causes the processor to implement operations comprising:

receiving video stream data and dynamic comment data for a live stream; wherein, the video stream data carry object area data, the object area data being used for determining an area occupied by an object in a live stream picture;

determining the area occupied by the object in the live stream picture, wherein the determining the area occupied by the object in the live stream picture comprises:

mapping each coordinate point in a set of coordinate points to a target coordinate point based on a predetermined mapping relationship, wherein the predetermined mapping relationship is a mapping relationship among a size of an image output by contour recognition, a size of an image of a video frame, and a size of an image of the live stream picture, sequentially connecting the target coordinate points to obtain a closed curve, and determining an area defined by the closed curve as the area occupied by the object in the live stream picture; and displaying the live stream picture based on the video stream data, and displaying a dynamic comment outside the area occupied by the object in the live stream picture based on the object area data and the dynamic comment data.

11. The electronic device of claim 10, wherein the method further comprises:

obtaining dynamic comment data for a live stream; and displaying a live stream picture based on the video stream data, rendering and displaying a dynamic comment outside an area occupied by the object in the live stream picture based on the object area data and the dynamic comment data.

12. The electronic device of claim 10, wherein the adding the object area data to the video stream data and sending the video stream data comprises:

adding the object area data as supplemental enhancement information to the video stream data based on a predetermined video stream encoding rule.

13. The electronic device of claim 10, wherein the operations further comprise determining the area occupied by the object in a live stream picture through:

for each coordinate point in the set of coordinate points, mapping the coordinate point to a target coordinate point based on a predetermined mapping relationship, wherein the mapping relationship is a mapping relationship among a size of an image output by the contour recognition, a size of an image of the video frame and a size of an image of the live stream picture;

sequentially connecting the target coordinate points to obtain a closed curve; and determining an area defined by the closed curve as the area occupied by the object in the live stream picture.

14. The electronic device of claim 13, wherein the mapping the coordinate point to the target coordinate point based on the predetermined mapping relationship comprises:

determining a first scaling parameter based on the size of the image output by the contour recognition and the size of the image of the video frame;

determining a second scaling parameter based on the size of the image of the video frame and the size of the image of the live stream picture;

determining a clipping parameter based on the size of the image output by the contour recognition, the size of the image of the video frame and the size of the image of the live stream picture; and mapping the coordinate point to the target coordinate point based on the first scaling parameter, the second scaling parameter, and the clipping parameter.

15. The electronic device of claim 14, wherein the coordinate point comprises a horizontal coordinate and a vertical coordinate;

mapping the coordinate point to the target coordinate point based on the predetermined mapping relationship comprises:

determining a movement parameter based on the size of the image of the live stream picture;

mapping the horizontal coordinate based on the first scaling parameter, the second scaling parameter, and the clipping parameter;

mapping the vertical coordinate based on the first scaling parameter, the second scaling parameter, and the movement parameter; and obtaining the target coordinate point based on the mapped horizontal coordinate and the mapped vertical coordinate.

16. The electronic device of claim 10, wherein the mapping each coordinate point to the target coordinate point based on the predetermined mapping relationship comprises:

determining a first scaling parameter based on the size of the image output by the contour recognition and the size of the image of the video frame;

determining a second scaling parameter based on the size of the image of the video frame and the size of the image of the live stream picture;

determining a clipping parameter based on the size of an image output by the contour recognition, the size of the image of the video frame and the size of the image of the live stream picture; and mapping each coordinate point to the target coordinate point based on the first scaling parameter, the second scaling parameter, and the clipping parameter.

* * * * *